United States Patent [19]

Burkhardt et al.

[11] Patent Number: 4,609,487

[45] Date of Patent: Sep. 2, 1986

[54] GEL-FORMING MIXTURE BASED ON AN ALKALI SILICATE AND A TRIALKOXYSILANE

[75] Inventors: Rudolf Burkhardt; Hansjürgen Hass, both of Troisdorf; Horst Hanisch, Mondorf; Günter Vogel, Hennef, all of Fed. Rep. of Germany

[73] Assignee: Dynamit Nobel Aktiengesellschaft, Troisdorf, Fed. Rep. of Germany

[21] Appl. No.: 702,432

[22] Filed: Feb. 19, 1985

Related U.S. Application Data

[63] Continuation of Ser. No. 451,906, Dec. 21, 1982, abandoned.

[30] Foreign Application Priority Data

Dec. 28, 1981 [DE] Fed. Rep. of Germany ....... 3151680

[51] Int. Cl.$^4$ ............................. B01J 13/00; C09J 1/02
[52] U.S. Cl. ............................. 252/315.5; 252/315.6; 252/8.514; 106/74; 106/900
[58] Field of Search ............. 252/315.01, 315.2, 315.5, 252/315.6, 8.5 B, 8.5 A; 106/900, 74, 75

[56] References Cited

U.S. PATENT DOCUMENTS

| | | | |
|---|---|---|---|
| 4,120,938 | 10/1978 | Haase et al. | 106/74 |
| 4,213,785 | 7/1980 | Blanc et al. | 106/74 |
| 4,229,222 | 10/1980 | Schneider | 106/74 |
| 4,293,340 | 10/1981 | Metz | 106/74 |
| 4,316,807 | 2/1982 | McDaniel et al. | 252/315.2 |

*Primary Examiner*—John F. Terapane
*Assistant Examiner*—Anne Brookes
*Attorney, Agent, or Firm*—Felfe & Lynch

[57] ABSTRACT

The present invention relates to liquid mixtures of alkali metal silicates, water, and trialkoxysilanes of the general formula R—Si(OR')$_3$, which harden to form silica-containing gels within a predetermined length of time. The mixtures can contain additional means for influencing the gelling and the gel strength. The most important field of application of the gels in accordance with the invention is the stabilization of soils in architecture and civil engineering.

7 Claims, No Drawings

GEL-FORMING MIXTURE BASED ON AN ALKALI SILICATE AND A TRIALKOXYSILANE

The application is a continuation of application Ser. No. 451,906 filed Dec. 21, 1982, now abandoned.

BACKGROUND OF THE INVENTION

The present invention concerns fluid mixtures of alkali metal silicates, water and a gelling agent, which stiffen within a predetermined length of time to form gels containing silica. An important field of application is the stabilization of the soil in building construction.

The separate or combined use of aqueous solutions of alkali silicate and gelling agents for soil stabilization has long been known. The most commonly used gelling agents are those which can be mixed with the silicate solution without immediately forming a gel, and which produce the gelling action after a time sufficient for the preparation and application of the mixture. By the injection of these liquid mixtures into the ground, permeable soils can be sealed and strengthened.

The properties and the adaptation of the gels are controlled by the nature and amount both of the alakli silicate and of the gelling agent.

The gels must have a low and slow syneresis to produce an effective sealing of soil. The term "syneresis" refers to the shrinkage of the gels, accompanied by the segregation of an aqueous phase (syneresis water).

The use of water glass solutions with sodium aluminate as gelling agent, which is known as the monosol process, satisfies these requirements in the low range of water glass concentrations. These gels have a good sealing action, but virtually no inherent strength. A substantial improvement of the gel strength by increasing the water glass concentration and hence the silica content of the gels is not possible, because if mixtures are prepared with a silica content of more than about 110 grams per liter, the danger exists of an immediate gelling or precipitation upon the addition of the sodium aluminate. Consequently, only gels having a maximum silica content of about 120 grams per liter can be produced in the soil, and their strengthening effect is very poor.

Other gelling agents, which are frequently organic, are used in strengthening soils with mixtures based on alkali silicates. The organic agents, mainly esters as well as a number of amides and aldehydes, can also be admixed with high-content water glass solutions without the danger of an immediate reaction.

For example, it is known from French Patent Nos. 1,164,835 and 1,502,645 to use alkyl esters of low fatty acids in mixtures with alkali silicate solutions for the stabilization of soil. According to German Patent Nos. 1,567,776 and 2,242,713, the alkyl esters of dicarboxylic acids, such as succinic acid, glutaric acid and adipic acid, are suitable as gelling agents. A disadvantage of most of the alkyl esters, including ethyl acetate, is their poor solubility in water glass solutions, which can result in separation of unreacted esters as an upper layer. Irregular gelling and contamination of ground water may be the result.

To avoid these disadvantages, a number of water-soluble esters are recommended as gelling agents. In French Patent No. 2,175,481, glycerine acetate mixtures, and in British Patent No. 1,109,140, cyclic esters of the lactone or alkylene carbonate type, are named as suitable gelling agents for alkali silicate solutions.

The high strength and hence also the strengthening action of the gels produced by means of organic gelling agents is based mainly on their high silica content. This is to be attributed not only to the higher silicate concentrations of these mixtures but also to the great syneresis of the gels. With the shrinkage of the gels, which can amount to about 50 to 70% in the case of medium silicate concentrations (approx. 45 to 70% by volume of technical water glass solution of a density from about 1.25 to about 1.45, corresponding to 30 to 45° Baumé), their percentage content of silica increases by a similar amount. While the strength of the gels increases with syneresis, their sealing action decreases, since the pore volume of the treated soil is still only partially filled with the gel. Upon an increase in permeability to moisture, or upon a sudden invasion of water, considerable amounts of organic hydrolysis products and an unchanged residue of the gelling agent can be carried along with the syneresis water into the ground water and this can result in an unacceptably great pollution.

In practice it is often necessary both to seal and to strengthen a site. The formation of a gel to fulfill both requirements requires a suppression of the syneresis that might result in permeability. The possibilities for this purpose are: (1) to increase the silicate content of the gel forming mixture to more than 75%, for example, of the volume of the technical water glass solution, thereby suppressing the segregation of syneresis water; and (2) to bind or entrap the syneresis water by the addition of structurizing agents, such as cement suspensions for example. In both these cases, the above-named organic substances have been used as gelling agents, and in the second case formamide, especially, has been used; the use of formamide, however, is objectionable on account of its toxic (teratogenic) effect. For the treatment of finely granular soils, however, neither of these two possibilities can be contemplated, since the penetrating ability of the mixtures is greatly reduced, in the first place by the high viscosity, and in the second case by the solid content. In practice, therefore, such finely granular soils are first treated with a sealing mixture, and then the strengthening mixture is injected. Such a procedure is very time-consuming and is virtually twice as difficult and time-consuming as a onestep procedure.

It is therefore the object of the present invention to develop mixtures on an alkali silicate basis which will be suitable for soil stabilization and which not only will assure a reliable sealing action but will also strengthen soils and be suitable for the treatment of finely granular soils.

THE INVENTION

For the achievement of this object, a gel-forming mixture of alkali metal silicate, water and gelling agent has been found which contains as gelling agent a trialkoxysilane of the formula $R-Si(OR')_3$ in which R represents an aliphatic moiety of 1 to 6 carbon atoms, and the moieties R', which can be alike or different are alkyl moieties of 1 to 4 carbon atoms. Preferred trialkoxysilanes are n-propyl-, isopropyl- and isobutyl-trimethoxysilane and -triethoxysilane. The alkoxy groups of these silanes can also be partially in hydrolyzed form as OH groups.

The amount of the silane to be used as the gelling agent in accordance with the invention depends on the molecular weight of the silane, on the water glass content, and on the desired setting time of the mixture. For mixtures containing 10 to 90% by volume of water and 90 to 10% by volume of sodium silicate with a density of 30° to 43° Bé ($d_4^{20}$=1.25 to 1.4), and a setting time from 30 to 300 minutes, it amounts to 20 to 140 grams per liter of mixture corresponding to a molar ratio of silane to silica of (0.05 to 0.28): 1.

By modifying the ratio of the gelling agent to the alkali silicate, the gelling time of the mixtures of the invention can be varied within wide limits. The gelling time as well as the gel strengths can furthermore be adjusted by additional agents to be added to the mixture of alkali metal silicate, water and trialkoxysilane. Such additional agents for modifying the gelling time are, for example, hydroxides and alkalinely reacting salts of the alkali metals and of ammonium, of which especially sodium compounds, such as NaOH, $Na_2CO_3$, $NaOOCCH_3$ or $Na_3PO_4$, are suitable for shortening the setting time. Other gelling agents for aqueous alkali silicate solutions, however, are also suitable, such as the alkylene carbonates (e.g., ethylene carbonate or 1,2-propylene carbonate), which bring about not only a shortening of the setting time but also a more rapid increase in the strength of the gel. These substances can be added to the mixture of alkali silicate, water and silane in amounts of up to about 3% of the weight of the mixture. Also known emulsifiers, especially non-ionic, can be added.

With the aid of the additional agents, the properties of the mixtures of the invention can be quickly adapted to unforeseen differences in local soil conditions. These exceptional cases require principally mixtures having short gelling time and quick sealing or strengthening action. In all other cases, additional agents are neither necessary nor advantageous.

By the term "alkali silicates", as used herein, the known potassium and especially sodium silicates are to be understood in accordance with the invention. On the basis of the method of their manufacture, they are aqueous solutions with various contents of alkali oxide and silica. They are therefore used in this aqueous solution form, preference being given to concentrated solutions having a density $d_4^{20}$ of approximately 1.25 to 1.40 (corresponding to 30° to 43° Bé). Depending on their application, the solutions are diluted with water to the desired degree of concentration.

In general, the composition of the mixtures of alkali silicate solution and gelling agent that is used in soil stabilization must take into account not only the nature of the soil and the intended effect, but also the compatibility of the components with one another and the gelling time that is to be obtained. The mixtures in accordance with the invention can be prepared without any danger of immediate gelling or precipitation even if undiluted technical water glass solutions are used which have a density of about 1.25 to about 1.40 (approximately 30° to 43° Bé). Throughout the range of common water glass concentrations, gel times between 30 and 300 minutes can be established by varying the amounts of trialkoxysilane. In all cases, very dense gels form primarily, which in their further behavior differ decidedly from the gels obtained from known mixtures of alkali silicate and gelling agents. The syneresis sets in later, and is much slower than in the case of gels from mixtures with known organic gelling agents. In the case of the silicate-to-trialkoxysilane ratios that are to be used preferentially, of 0.04 to 0.11 mol of silane per 100 $cm^3$ of water glass solution of a density of approximately 1.36 (corresponding to 38° to 40° Bé), it amounts to less than 10% after four weeks, and assures a high sealing effect over this period of time which is sufficient for many kinds of construction projects. The slowly increasing gel strength prevents the softening and dissolving phenomena observed in other sealing gels on contact with water, and leads to a desirable increase of the strengthening action.

The practical preparation and application of the mixtures of the invention can be accomplished with the equipment commonly used in soil treatment technology. The mixing of the components can be performed in two ways: (1) water glass solution and water are mixed in the desired ratio, the required amount of trialkoxysilane is added, and the mixture is stirred until it is dissolved, about 20 to 45 minutes being required for this purpose; (2) the required amount of trialkoxysilane is dissolved in an approximately equal amount of water which has been adjusted to a pH of 3.5 to 4 with a very small amount of mineral acid, and this solution is added to the mixture of water glass and the rest of the water. The first method can be used for virtually all concentration ratios, while the second, somewhat faster method can be used for mixtures of low water content (less than 70% by volume).

EXAMPLES

EXAMPLE 1

Technical water glass solution ($d_4^{20}$ approx. 1.35) and water were mixed in the percentages by volume indicated in Table I, the stated amount of n-propyltrimethoxysilane was added, and the mixture was stirred for 45 minutes. For characterization, the gelling time of the mixtures and the syneresis of the gels was determined.

Gelling time=time from the addition of the silane to the gelling of the mixture. The moment of gelling was considered to be reached when a glass rod drawn through the surface of the mixture left a track that remained visible after 5 seconds (approximately 100 m Pa.s). For confirmation, a determination was made of the time required to gel the mixture to such an extent that a sample no longer would flow out of a test-tube tilted more than 90° from the upright position; the time, which is not listed herein, averaged one minute less than the gelling time as determined above.

Syneresis is the volumetric shrinkage of the gel, determined by pouring off and measuring the syneresis water whose volume was given as a percent of the total volume.

EXAMPLE 2

60 ml of water glass solution ($d_4^{20}$ approx. 1.35), 40 ml of water and 5.9 g of isobutyltrimethoxysilane, plus 0.5 ml of emulsifier (40% solution of sodium alkylarylsulfonate) were stirred for 15 minutes. The gelling time of the resultant mixture was 33 minutes, measured from the addition of the silane. The stiff gel had virtually no syneresis (less than 1% after 28 days).

EXAMPLE 3

50 ml of water was acidified with dilute hydrochloric acid to a pH of 3.6, and stirred with 50 g of n-propyltrimethoxysilane. Within 7 minutes a uniform solution was obtained.

(a) 10 g of the 50% silane solution was stirred into a mixture of 30 ml of water glass solution ($d_4^{20}$=1.26) and 60 ml of water. The mixture stiffened after a gelling time of 95 minutes. The syneresis of the stiff gel amounted to 1.5% after 24 days.

(b) 15 g of the 50% silane solution was added drop by drop over a period of 3 minutes to a mixture of 60 ml of water glass solution ($d_4^{20} = 1.26$) and 30 ml of water, with vigorous stirring. The stirring was continued for another ten minutes, during which the initial turbidity largely disappeared. After 92 minutes, a stiff, opaque gel had formed which had a very low syneresis (0.5% after 24 days).

TABLE I

| Water glass (ml) | Water (ml) | Silane (g) | Gelling time (min) | Syneresis (%) after x days | | | | |
|---|---|---|---|---|---|---|---|---|
| | | | | 1 | 3 | 7 | 14 | 28 |
| 20 | 80 | 4.5 | 80 | 0 | 1 | 3 | 6 | 10 |
| 30 | 70 | 5.5 | 99 | 0 | 0 | 0.5 | 2 | 5 |
| 50 | 50 | 6.0 | 100 | 0 | 0 | <0.5 | 2 | 5 |
| 60 | 40 | 6.5 | 104 | 0 | 0 | <0.5 | 0.5 | 1 |
| 70 | 30 | 7.5 | 98 | 0 | 0 | <0.5 | 3 | 6 |
| 80 | 20 | 8.0 | 85 | 0 | 0 | 0 | <0.5 | 0.5 |

EXAMPLE 4

Three mixtures of different gelling rates were prepared from 60 ml of water glass solution ($d_4^{20}$=approx. 1.35) and 40 ml of water in each case, using different amounts of n-propyltrimethoxysilane. The results are presented in Table II. The preparation of the mixtures was repeated, with the addition of sodium hydroxide to shorten the gelling time. The sodium hydroxide was added in a number of moles equal to the moles of the silane, in the water content of the mixtures.

TABLE II

| Test | Silane (g) | NaOH (g) | Gelling time (minutes) | Syneresis of the gels in % after | |
|---|---|---|---|---|---|
| | | | | 3 days | 14 days |
| a | 4.5 | — | 417 | 0 | 1.0 |
| | | 1.12 | 119 | 0.5 | 4.5 |
| b | 5.5 | — | 218 | 0 | 0.5 |
| | | 1.37 | 62 | 0.5 | 6.5 |
| c | 6.5 | — | 104 | 0 | 0.5 |
| | | 1.62 | 43 | 0.5 | 8.5 |

EXAMPLE 5

2.5 g of 1,2-propylene carbonate was added to the mixture described in Example 4b of 60 ml of water glass solution ($d_4^{20}$ approx. 1.35), 40 ml of water and 5.5 g of n-propyltrimethoxysilane which had been stirred for 30 minutes (gelling time 218 minutes); after 18 minutes the mixture stiffened to a solid gel of higher syneresis (4.4% in 3 days, 21% in 17 days).

It will be understood that the specification and examples are illustrative but not limitative of the present invention and that other embodiments within the spirit and scope of the invention will suggest themselves to those skilled in the art.

What is claimed is:

1. A gel-forming mixture consisting essentially of an aqueous alkali metal silicate solution having a density of 1.25 to 1.4 and as gelling agent, a trialkoxysilane of the formula

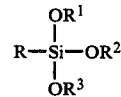

in which R is an aliphatic moiety of 1 to 6 carbon atoms and $R^1$, $R^2$ and $R^3$ which can be the same or different, represent alkyl moieties of 1 to 4 carbon atoms wherein the mole ratio of the silane to $SiO_2$ is 0.05:1 to 0.28:1.

2. The gel-forming mixture of claim 1, wherein the trialkoxysilane is n-propyltrimethoxysilane; i-propyltrimethoxysilane; i-butyltrimethoxy silane; n-propyltriethoxysilane; i-propyltriethoxy silane and i-butyltriethoxysilane.

3. The gel-forming mixture of claim 2, having, as an additional means for adjustment of the gelling time and/or of the gel strength, hydroxides and/or alkalinely reacting salts of the alkali metals or of ammonium.

4. The gel-forming mixture of claim 1, having, as an additional means for adjustment of the gelling time and/or of the gel strength, hydroxides, and/or alkalinely reacting salts of the alkali metals or of ammonium.

5. The gel-forming mixture of claim 1 having, as an additional means for the adjustment of the gelling time, an additional gelling agent for alkali silicate solutions.

6. the gel-forming mixture of claim 1, having as an additional means for the adjustment of gelling time, ethylene carbonate or 1,2-propylene carbonate.

7. A method of stabilizing soil comprising introducing into the soil, an effective amount of the gel-forming mixture of claim 1.

* * * * *